US008361577B2

(12) United States Patent
Arpin

(10) Patent No.: US 8,361,577 B2
(45) Date of Patent: Jan. 29, 2013

(54) LONG-TERM HEAT AGING RESISTANT IMPACT MODIFIED POLY(CYCLOHEXYLENE-DIMETHYLENE) TEREPHTHALATE COMPOSITIONS

(75) Inventor: Thierry Arpin, Ambilly (FR)

(73) Assignee: Ticona LLC, Florence, KY (US)

( * ) Notice: Subject to any disclaimer, the term of this patent is extended or adjusted under 35 U.S.C. 154(b) by 655 days.

(21) Appl. No.: 12/482,488

(22) Filed: Jun. 11, 2009

(65) Prior Publication Data

US 2010/0028579 A1 Feb. 4, 2010

Related U.S. Application Data

(60) Provisional application No. 61/137,413, filed on Jul. 30, 2008.

(51) Int. Cl.
*B32B 1/08* (2006.01)
*B23B 23/00* (2006.01)

(52) U.S. Cl. ............ 428/35.7; 428/34.1; 428/34.2; 428/35.9; 428/36.9; 524/80; 524/81

(58) Field of Classification Search .............. 428/34.1, 428/34.2, 35.7, 35.9, 36.9; 524/80, 81
See application file for complete search history.

(56) References Cited

U.S. PATENT DOCUMENTS

| 3,350,372 | A | 10/1967 | Anspon |
| 3,404,134 | A | 10/1968 | Rees |
| 3,435,093 | A | 3/1969 | Cope |
| 3,756,996 | A | 9/1973 | Pugh |
| 4,319,872 | A | 3/1982 | Lupke |
| 4,536,531 | A * | 8/1985 | Ogawa et al. ............. 524/135 |
| 5,028,674 | A | 7/1991 | Hatch |
| 6,500,888 | B2 | 12/2002 | Baumgartner |
| 6,764,627 | B2 | 7/2004 | D'Angelo |
| 7,022,768 | B1 * | 4/2006 | Lacroix et al. ............ 525/166 |

FOREIGN PATENT DOCUMENTS

| EP | 0 174 343 | 4/1992 |
| WO | 03/055664 | 7/2003 |
| WO | 2006/086334 | 8/2006 |

OTHER PUBLICATIONS

JP2008088390, Apr. 17, 2008, Abstract.

* cited by examiner

*Primary Examiner* — Marc Patterson
(74) *Attorney, Agent, or Firm* — Dority & Manning, P.A.

(57) ABSTRACT

The invention relates to polyester compositions comprising a) a poly(cyclohexylene-dimethylene)terephthalate (PCT) resin, b) at least one copolyester elastomer and c) at least three ethylene copolymers chosen among c1) one or more ethylene alkyl-(meth)acrylate copolymers; c2) one or more ethylene acid copolymers and/or ionomers thereof; and c3) one or more ethylene epoxide copolymers. The disclosed polyester compositions are particularly well suited for manufacturing articles that maintain good mechanical properties against long-term high temperature exposure, i.e. for high temperature applications.

15 Claims, No Drawings

LONG-TERM HEAT AGING RESISTANT IMPACT MODIFIED POLY(CYCLOHEXYLENE-DIMETHYLENE) TEREPHTHALATE COMPOSITIONS

FIELD OF INVENTION

The present invention relates to the field of impact modified poly(cyclohexylene-dimethylene)terephthalate (PCT) compositions having improved long-term high temperature aging characteristics.

BACKGROUND OF THE INVENTION

High temperature resins based polyesters possess desirable chemical resistance, proccessability and heat resistance. This makes them particularly well suited for demanding high performance applications.

Thermoplastic materials are known to be useful materials to produce hollow bodies, such as pipes, ducts, conduits, tubes and tubings. While hollow bodies can be manufactured by blow molding techniques, manufacturing costs and productivity can be improved by manufacturing them by melt extrusion processes. Melt extrusion processes begin by extruding a thermoplastic melt through an orifice of a die forming an extrudate capable of maintaining a desired shape. The extrudate is typically drawn into its final dimensions while maintaining the desired shape and is then quenched in air or a water bath to set the shape, thereby producing a hollow body. Hollow bodies made of thermoplastic are well known for a variety of applications, like for example in the building industry for water pipes, radiator pipes or floor-heating pipes or in automotive conduits to carry many different fluids or liquid media and are desired to display an outstanding balance of properties including thermal and mechanical resistances. All of these applications include the use of aliphatic polyamide, thermoplastic polyester elastomer, high-heat rubber composites and braided polytetrafluoroethylene (PTFE).

There is a current and general desire in the automotive field to have high temperature resistant structures since temperatures higher than 100° C., even higher than 150° C., are often reached in underhood areas of automobiles. For this reason, the use of aliphatic polyamide is limited in these high temperature applications. Whereas high-heat rubber composites and braided PTFE can be used in these higher heat environments, the structures are often complex and expensive.

Moreover, it is required that thermoplastic articles retain their structural integrity for a prolonged period in the face of the surrounding environment and deleterious conditions that are met in the automotive industry for example so that the functionality of the article is maintained until the end of its life time. However, when plastic parts are exposed to high temperatures for a prolonged period, such as in automotive under-the-hood applications or in electrical/electronics applications, the mechanical properties generally tend to decrease due to the thermo-oxidation of the polymer. This phenomenon is called heat aging. In an attempt to improve heat aging characteristics, it has been the conventional practice to add heat stabilizers and impact modifiers to thermoplastic compositions comprising polyester.

U.S. Pat. No. 3,435,093 discloses a polyethylene terephthalate (PET) composition comprising an ethylene acid copolymer, which ethylene acid copolymer may be neutralized to form the corresponding ionomer. Such a composition is said to exhibit improved elongation at room temperature. However, this polyethylene terephthalate composition does not withstand high temperatures such as those obtained under hood.

U.S. Pat. No. 7,022,768 discloses a polyester composition comprising from 60 to 99 wt-% of a thermoplastic polyester and from 1 to 40 wt-% of an impact modifier comprising a core-shell copolymer, an ethylene-unsatured epoxide copolymer, an ethylene alkyl(meth)acrylate copolymer and optionally an ionomer. Such a composition is said to exhibit shock-proof properties especially at low temperatures.

EP 0174343 discloses a polyester composition comprising from 60 to 97 wt-% of a thermoplastic polyester and from 3 to 40 wt-% of a glycidyl(meth)acrylate ethylene copolymer. Such a composition is said to exhibit high toughness especially at low temperatures.

U.S. Pat. No. 3,435,093 discloses a polyester composition comprising an ethylene acid copolymer wherein the carboxylic groups of the copolymers may be neutralized by a metal cation. Such compositions are said to exhibit improved elongation in comparison with parts made of polyester alone after a 16 hours treatment at 200° C. under nitrogen.

Unfortunately, existing technologies lead not only to a poor improvement of long-term heat aging resistance, but also the molded articles obtained thereof suffer from an unacceptable deterioration of their mechanical properties due to thermo-oxidation upon long-term high temperature exposure.

There remains a need for poly(cyclohexylene-dimethylene) terephthalate compositions that are suitable for manufacturing articles and that maintain good mechanical properties against long-term high temperature exposure.

SUMMARY OF THE INVENTION

The inventor has surprisingly found that a polyester composition comprising a) a poly(cyclohexylene-dimethylene) terephthalate polymer, b) at least one copolyester elastomer and c) at least three ethylene copolymers chosen among c1) one or more ethylene alkyl-(meth)acrylate copolymers; c2) one or more ethylene acid copolymers and/or ionomers thereof; and c3) one or more ethylene epoxide copolymers have increased mechanical properties upon long-term high temperature exposure.

In a second aspect, the invention provides a method of manufacturing the polyester composition which comprises a step of mixing all ingredients comprised in the composition.

In a third aspect, the invention provides an article made out of the polyester composition of the invention.

In a fourth aspect, the invention provides a use of the polyester composition of the invention for high temperature applications.

In a fifth aspect, the invention provides a process for making an article comprising a step of shaping the polyester composition according to the present invention, which article demonstrates long-term heat aging resistance.

DETAILED DESCRIPTION OF THE INVENTION

As used throughout the specification, the phrases "about" and "at or about" are intended to mean that the amount or value in question may be the value designated or some other value about the same. The phrase is intended to convey that similar values promote equivalent results or effects according to the invention.

For the purposes of the description, high temperature means temperatures at or in excess of 120° C. and preferably at or in excess of 150° C.

For the purposes of the description, long-term means aging at or in excess of 1000 hours and preferably at or in excess of 1500 hours.

For the purposes of the description, the phrase "chosen among" means "selected from the group consisting of", in that a selection is made from the recited groups.

High temperature resins based on poly(cyclohexylene-dimethylene)terephthalate (PCT) possess desirable chemical resistance, proccessability and heat resistance. This makes them particularly well suited for demanding high performance automotive and electrical/electronics applications. Poly(cyclohexylene-dimethylene)terephthalate is a polyester formed from a diol and a dicarboxylic acid. By "poly(1,4-cyclohexanedimethanol terephthalate)" (PCT) is meant a polyester formed from a diol and a dicarboxylic acid. At least about 80 mole percent, more preferably at least about 90 mole percent, and especially preferably all of the diol repeat units are derived from 1,4-cyclohexanedimethanol and are of formula (I).

(I)

At least about 80 mole percent, more preferably at least about 90 mole percent, and especially preferably all of the dicarboxylic acid repeat units are derived from terephthalic acid and are of formula (II).

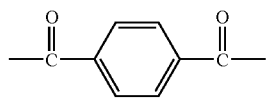

(II)

The PCT may also contain up to 10 mole percent (based on the total amount of (I) and (II) present) of one or more repeat unit derived from hydroxycarboxylic acids, although it is preferred that no such repeat unit be present. One particular preferred PCT contains (I) as the diol repeat unit, (II) is 95 mole percent of dicarboxylic acid repeat unit and the other 5 mole percent of the dicarboxylic repeat unit is derived from isophthalic acid, and no repeat units derived from hydroxycarboxylic acid are present.

Preferably, the polyester composition comprise from at or about 30 to at or about 70 wt-%, more preferably from at or about 35 to at or about 50 wt-%, of the poly(cyclohexylene-dimethylene)terephthalate polymer, the weight percentages being based on the total weight of the polyester composition, i.e. the sum of components a)+b)+c) in accordance with the invention.

Copolyester elastomers b) can be copolyetherester elastomers or copolyesterester elastomers. Preferably, the one or more copolyester elastomers used in the present invention are copolyetherester elastomers. Copolyetheresters are copolymers that have a multiplicity of recurring long-chain ester units and short-chain ester units joined head-to-tail through ester linkages, said long-chain ester units being represented by formula (A):

(A)

and said short-chain ester units being represented by formula (B):

(B)

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a diol having a molecular weight less than about 250; and
wherein said copolyetherester(s) preferably contain from about 15 to about 99 wt-% short-chain ester units and about 1 to about 85 wt-% long-chain ester units, or wherein the copolyetherester(s) more preferably contain from about 20 to about 95 wt-% short-chain ester units and about 5 to about 80 wt-% long-chain ester units.

As used herein, the term "long-chain ester units" as applied to units in a polymer chain refers to the reaction product of a long-chain glycol with a dicarboxylic acid. Suitable long-chain glycols are poly(alkylene oxide)glycols having terminal (or as nearly terminal as possible) hydroxyl groups and having a number average molecular weight of from about 400 to about 6000, and preferably from about 600 to about 3000. Preferred poly(alkylene oxide)glycols include poly(tetramethylene oxide)glycol, poly(trimethylene oxide)glycol, poly(propylene oxide)glycol, poly(ethylene oxide)glycol, copolymer glycols of these alkylene oxides, and block copolymers such as ethylene oxide-capped poly(propylene oxide)glycol. Mixtures of two or more of these glycols can be used.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol. Included among the bisphenols which can be used are bis(p-hydroxy) diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol). As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e. having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative. Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with the copolyetherester polymer formation and use of the polymer in the compositions of this invention.

The term "aliphatic dicarboxylic acids," as used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—.

Representative useful aliphatic and cycloaliphatic acids that can be used include sebacic acid; 1,3-cyclohexanedicarboxylic acid; 1,4-cyclohexanedicarboxylic acid; 1,2-cyclohexanedicarboxylic acid; adipic acid; glutaric acid; 2-ethylsuberic acid; cyclopentanedicarboxylic acid; decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl)carboxylic acid; and 3,4-furan dicarboxylic acid. Preferred acids are cyclohexanedicarboxylic acids and adipic acid. Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy) benzoic acid can also be used provided an aromatic dicarboxylic acid is also used.

Aromatic dicarboxylic acids are a preferred class for preparing the copolyetherester polymers useful for this invention. Among the aromatic acids, those with 8-16 carbon atoms are preferred, particularly terephthalic acid alone or with a mixture of phthalic and/or isophthalic acids.

The copolyetheresters preferably comprise about 15 to about 99 wt-% short-chain ester units corresponding to Formula (B) above, the remainder being long-chain ester units corresponding to Formula (A) above. The copolyetheresters more preferably comprise about 20 to about 95 wt-%, and even more preferably about 50 to about 90 wt-% short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to make the copolyetherester, isophthalic acid is preferred and if a second low molecular weight diol is used, ethylene glycol, 1,3-propanediol, cyclohexanedimethanol, or hexamethylene glycol are preferred.

Preferably, the copolyetherester elastomers are prepared from esters or mixtures of esters of isophthalic acid and/or terephthalic acid, 1,4-butanediol and/or 1,3-propanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, 1,4-butanediol and poly(tetramethylene ether)glycol.

The polyester composition according to the present invention comprises from at or about 10 to at or about 50 wt-%, more preferably from at or about 15 to at or about 40 wt-% of the at least one copolyester elastomer b), the weight percentages being based on the total weight of the polyester composition, i.e. the sum of components a), b) and c) in accordance with the invention.

Copolyetherester elastomers suitable for the present invention are commercially available from E. I. du Pont de Nemours and Company, Wilmington, Del. under the trademark Hytrel®.

The polyester composition according to the present invention comprises at least three ethylene copolymers c) chosen among ethylene alkyl-(meth)acrylate copolymers c1), ethylene acid copolymer and/or ionomers thereof c2) and one or more ethylene epoxide copolymers c3). The polyester composition according to the present invention comprises from at or about 10 to at or about 50 wt-%, more preferably from at or about 15 to at or about 40 wt-% of the at least three ethylene copolymers c), the weight percentages being based on the total weight of the polyester composition, i.e. the sum of components a), b) and c) in accordance with the invention.

Preferably, one of the at least three ethylene copolymers is c1) one or more ethylene alkyl-(meth)acrylate copolymers; the second of the at least three ethylene copolymers is c2) one or more ethylene acid copolymers and/or ionomers thereof; and the third of the at least three ethylene copolymers is c3) one or more ethylene epoxide copolymers. More preferably, one of the at least three ethylene copolymers is c1) one or more ethylene alkyl-(meth)acrylate copolymers; the second of the at least three ethylene copolymers is c2) one or more ionomers; and the third of the at least three ethylene copolymers is c3) one or more ethylene epoxide copolymers.

Preferably, the one or more ethylene alkyl-(meth)acrylate copolymers c1) are present in an amount from at or about 5 to at or about 30 wt-%; the ethylene acid copolymers and/or ionomers thereof c2) are present in an amount from at or about 1 to at or about 20 wt-%; and the one or more ethylene epoxide copolymers c3) are present in an amount from at or about 1 to at or about 20 wt-%, provided that the sum of components c1)+c2)+c3) is less than or equal to 50 wt-%, the weight percentages being based on the total weight of the polyester composition, i.e. the sum of components a)+b)+c) in accordance with the invention. More preferably, the one or more ethylene alkyl-(meth)acrylate copolymers c1) are present in an amount from at or about 10 to at or about 25 wt-%; the ethylene acid copolymers and/or ionomers thereof c2) are present in an amount from at or about 2 to at or about 15 wt-%; and the one or more ethylene epoxide copolymers c3) are present in an amount from at or about 2 to at or about 15 wt-%, provided that the sum of components c1)+c2)+c3) is less than or equal to 40 wt-%, the weight percentages being based on the total weight of the polyester composition, i.e. the sum of components a)+b)+c) in accordance with the invention.

Ethylene alkyl(meth)acrylate copolymers are thermoplastic ethylene copolymers comprising repeat units derived from ethylene and at least one alkyl(meth)acrylate, wherein the alkyl group contains from one to ten carbon atoms and preferably from one to four carbon atoms. "Alkyl(meth)acrylate" refers to alkyl acrylate and/or alkyl methacrylate. Examples of alkyl(meth)acrylates include methyl(meth)acrylate, ethyl (meth)acrylate and butyl(meth)acrylate. For example, "ethylene methyl acrylate (EMA)" means a copolymer of ethylene and methyl acrylate (MA); "ethylene ethyl acrylate (EEA)" means a copolymer of ethylene and ethyl acrylate (EA); "ethylene butyl acrylate (EBA)" means a copolymer of ethylene and butyl acrylate (BA); and includes both n-butyl acrylate and iso-butyl acrylate; and combinations of two or more thereof. Preferably, the one or more ethylene alkyl (meth)acrylate copolymer used in the polyester composition according to the present invention is an ethylene methyl acrylate.

Preferably, the one or more ethylene alkyl(meth)acrylate copolymers used in the present invention contain alkyl(meth) acrylate in an amount from at or about 5 to at or about 40 wt-% and still more preferably in an amount from at or about 20 to at or about 35 wt-%, the weight percentages being based on the total weight of the ethylene alkyl (meth)acrylate copolymer.

Ethylene copolymers suitable for use in the polyester composition according to the present invention can be produced by any means known to one skilled in the art using either autoclave or tubular reactors (e.g. U.S. Pat. No. 3,404,134, U.S. Pat. No. 5,028,674, U.S. Pat. No. 6,500,888, U.S. Pat. No. 3,350,372 and U.S. Pat. No. 3,756,996).

Ethylene acid copolymers are thermoplastic ethylene copolymers comprising repeat units derived from ethylene and one or more α,β-ethylenically unsaturated carboxylic acids comprising from 3 to 8 carbon atoms. The ethylene acid copolymers may optionally contain a third, softening monomer. This "softening" monomer decreases the crystallinity of the ethylene acid copolymer. Ethylene acid copolymers can thus be described as E/X/Y copolymers, wherein E is ethylene, X is an α,β-ethylenically unsaturated carboxylic acid, and Y represents copolymerized units of the softening comonomer (e.g. alkyl acrylates and alkyl methacrylates, wherein the alkyl groups have from 1 to 8 carbon atoms). The amount of X in the ethylene acid copolymer is from about 1 to at or about 35 wt-%, and the amount of Y is from 0 to about 59 wt-%, the weight percentage being based on the total weight of the ethylene acid copolymer. Preferred examples ethylene acid copolymers are ethylene acrylic acid and ethylene methacrylic acid copolymers, ethylene methacrylic acid being especially preferred.

Ionomers are thermoplastic resins that contain metal ions in addition to the organic backbone of the polymer. Ionomers are ionic copolymers ethylene with partially neutralized (from 10 to 99.9%) α,β-unsaturated $C_3$-$C_8$ carboxylic acid, such as acrylic acid (AA), methacrylic acid (MAA) or maleic acid monoethylester (MAME), methacrylic acid (MAA) being preferred. Suitable ionomers can be prepared from the ethylene acid copolymers described above. Preferably, the one or more ionomers contain from about 5 to about 30 wt-% of acrylic acid, methacrylic acid and/or maleic acid monoethylester, the weight percentage being based on the total weight of the ionomer. Neutralizing agents are alkali metals like lithium, sodium or potassium or transition metals like manganese or zinc. Compounds suitable for neutralizing an ethylene acid copolymer include ionic compounds having basic anions and alkali metal cations (e.g. lithium or sodium or potassium ions), transition metal cations (e.g. zinc ion) or alkaline earth metal cations (e.g. magnesium or calcium ions) and mixtures or combinations of such cations. Ionic compounds that may be used for neutralizing the ethylene acid copolymers include alkali metal formates, acetates, nitrates, carbonates, hydrogen carbonates, oxides, hydroxides or alkoxides. Other useful ionic compounds include alkaline earth metal formates, acetates, nitrates, oxides, hydroxides or alkoxides of alkaline earth metals. Transition metal formates, acetates, nitrates, carbonates, hydrogen carbonates, oxides, hydroxides or alkoxides may also be used. Preferred neutralizing agents are sources of sodium ions, potassium ions, zinc ions, magnesium ions, lithium ions, transition metal ions, alkaline earth metal cations and combinations of two or more thereof, sodium ions being more preferred. Suitable ionomers for use in the present invention are commercially available under the trademark Surlyn® from E. I. du Pont de Nemours and Company, Wilmington, Del.

Ethylene epoxide copolymers are ethylene copolymers that are functionalized with epoxy groups; by "functionalized", it is meant that the groups are grafted and/or copolymerized with organic functionalities. Examples of epoxides used to functionalize copolymers are unsaturated epoxides comprising from four to eleven carbon atoms, such as glycidyl(meth)acrylate, allyl glycidyl ether, vinyl glycidyl ether and glycidyl itaconate, glycidyl(meth)acrylates (GMA) being particularly preferred. Ethylene epoxide copolymers preferably contain from 0.05 to 15 wt-% of epoxy groups, the weight percentage being based on the total weight of the ethylene epoxide copolymer. Preferably, epoxides used to functionalize ethylene copolymers are glycidyl(meth)acrylates. The ethylene/glycidyl(meth)acrylate copolymer may further contain copolymerized units of an alkyl(meth)acrylate having from one to six carbon atoms and an α-olefin having 1-8 carbon atoms. Representative alkyl(meth)acrylates include methyl(meth)acrylate, ethyl(meth)acrylate, propyl(meth)acrylate, butyl(meth)acrylate, isobutyl(meth)acrylate, hexyl(meth)acrylate, or combinations of two or more thereof. Of note are ethyl acrylate and butyl acrylate.

The polyester composition according to the present invention may further comprise one or more polymeric tougheners such as for example core-shell copolymers. Core-shell copolymers have preferably a core portion having a glass transition temperature of 0° C. or less, while the shell portion has a glass transition temperature higher than that of the core portion. The core portion may be grafted with silicone. The shell section may be grafted with a low surface energy substrate such as silicone, fluorine, and the like. An acrylic polymer with a core-shell structure that has low surface energy substrates grafted to the surface will aggregate with itself during or after mixing with the thermoplastic polyester and other components of the composition of the invention and can be easily uniformly dispersed in the composition. When present, the tougheners preferably comprise from at or about 0.5 to at or about 25 wt-%, or more preferably from at or about 1 to at or about 15 wt-%, the weight percentages being based on the total weight of the polyester composition.

The polyester compositions according to the present invention may further comprise one or more additional thermoplastic polyesters chosen among polyethylene terephthalate (PET), polypropylene terephthalate (PPT), polybutylene terephthalate (PBT), polynaphthalene terephthalate, liquid crystalline polyesters (LCP) and mixtures thereof. Thermotropic liquid crystalline polymers (LCPs) are known in the art by various terms, including "liquid crystal" and "anisotropic melts. By a "liquid crystalline polymer" it is meant a polymer that is anisotropic when tested using the TOT test or any reasonable variation thereof, as described in U.S. Pat. No. 4,118,372, which is hereby included by reference. By "thermotropic" is meant that the polymer may be melted and then re-solidified, i.e. is thermoplastic. Useful LCPs for the present invention include polyesters, poly(ester-amides) and poly(ester-imides) or mixtures thereof. These terms have their usual meaning, and simply indicate that the repeat units in the polymer are joined by ester and optionally amide and/or imide linkages. Preferred polymers are liquid crystalline polyesters, and it is further preferred that these polyesters be aromatic polyesters. By "aromatic" is meant that, except for the carbon atoms contained in functional groups such as ester, amide or imide, all of the carbon atoms in the main chain of the polymer are present in aromatic rings such as phenylene, naphthylylene, biphenylene, etc. Carbon atoms in other types of groupings such as alkyl may be present as substituents on the aromatic rings, as in a repeat unit derived from methylhydroquinone or 2-t-butyl-4-hydroxybenzoic acid, and/or also present at other places in the polymer such as in n-alkyl amides. Other substituent groups such as halogen, ether, and aryl may also be present in the LCP. As the components of the wholly aromatic liquid crystalline polyester used in the polyester composition of the present invention, there may be used for example: i) hydroquinone; ii) 4,4'-dihydroxybiphenyl(4, 4'-biphenol); iii) isopthalic acid; iv) terephthalic acid; v) p-hydroxybenzoic acid or its derivatives; vi) 4,4'-dihydroxybiphenyl(4,4'-bibenzoic acid) or its derivatives; viii) 2,6-naphthalenedicarboxylic acid; iv) 6-hydroxy-2-naphthoic acid, or combinations thereof. These components are all known in the art and are commercially available or can be prepared by techniques readily available to those in the art. Of the combinations of these components, a combination of hydroquinone, 4,4'-dihydroxybiphenyl, terephthalic acid, p-hydroxybenzoic acid, and 2,6-naphthalenedicarboxylic acid, is preferred. Examples of liquid crystal polymer resins useful for the present invention are commercially available under the trademark Zenite® from E. I. du Pont de Nemours and Company, Wilmington, Del. When present, the one or more additional thermoplastic polyesters preferably comprise from at or about 0.5 to at or about 35 wt-%, or more preferably from at or about 1 to at or about 25 wt-%, the weight percentages being based on the total weight of the polyester composition.

The polyester compositions according to the present invention may optionally contain one or more oxidative stabilizers. Examples of suitable oxidative stabilizers include phosphite and hypophosphite stabilizers, hindered phenol stabilizers, hindered amine stabilizers, thioesters, and phenolic based anti-oxidants that hinder thermally induced oxidation of polymers where high temperature applications are used. When present, the oxidative stabilizers comprise from at or about 0.1 to at or about 5 wt-%, or preferably from at or about 0.5 to at or about 4 wt-%, the weight percentages being based on the total weight of the polyester composition.

The polyester composition used in the present invention may further include modifiers and other ingredients, including, without limitation, fillers, lubricants, UV light stabilizers, plasticizers, antistatic agents, coloring agents, flame retardants, flow enhancing additives, nucleating agents, crystallization promoting agents and other processing aids known in the polymer compounding art. These ingredients may be present in the composition in amounts and in forms well known in the art, including in the form of so-called nanomaterials where at least one of the dimensions of the particles is in the range of 1 to 1000 nm.

In another aspect of the invention, the polyester composition is manufactured by mixing all ingredients. The polyester compositions are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

In another aspect, the present invention relates to a process for making an article comprising a step of shaping the polyester composition according to the present invention and to the shaped article made from the polyester composition of the invention. Examples of articles are hollow bodies, laminates, films or filaments. By "shaping", it is meant any shaping technique, such as for example extrusion, injection moulding, thermoform moulding, compression moulding or blow moulding. The polyester composition of the invention is particularly well suited for manufacturing articles by extrusion.

The polyester composition of the invention may be used for manufacturing hollow bodies by melt extrusion processes, especially tube extrusion. Examples of tube extrusion processes include without limitation profile extrusion and corrugated extrusion. Both extrusion processes are conventional techniques used for manufacturing hollow plastic bodies in arbitrary long lengths. During profile and corrugated extrusion, the composition is extruded in a hot moldable state through the gap between the pin and the die of an extrusion head. By "profile extrusion", it is meant a technique used to produce a hollow article having the same cross section over a long length. The pin and die are shaped to produce the desired cross-section, and for example an annular die-gap between concentric circular pin and die is used to make tubes and pipes. After it exits the die assembly, the melt may be drawn to a thinner cross section through an air gap. The melt is then cooled and its shape is maintained. By "corrugated extrusion", it is meant a technique used to produce hollow articles comprising corrugated regions that may be interrupted by smooth regions. In this case, the pin and the die are positioned inside the two halves of the mold blocks of the equipment. When the molten material coming from the extrusion head reaches the mold blocks, it is drawn up to the shape of the mold article either by heated air or by vacuum expansion against the surface of the mold cavity. Such process is described for example in U.S. Pat. No. 6,764,627, U.S. Pat. No. 4,319,872 or WO 03/055664. Continuously or partially corrugated hollow bodies made out of the polyester composition according to the present invention enable complex routing of the hollow body in constrained spaces, such as those available in under hood areas of automobiles and other vehicles. Examples of hollow bodies include without limitation pipes, ducts, conduits, tubes and tubings.

In another aspect, the present invention relates to multilayer hollow bodies comprising one or more layers made from the polyester composition described above and one or more additional layers. Such multilayer hollow bodies may be manufactured by conventional processes such as for example co-extrusion, blow molding, injection molding, and corrugated extrusion, with co-extrusion being preferred. The one or more additional layers may be outside layers (i.e. facing the environment) or may be inside layers. The one or more additional layers include but are not limited to braidings, reinforcement layers, thermal shields and softer cover layers.

The invention will be further described in the Examples below.

Examples

The following materials were used for preparing the polyester composition according to the examples of the present invention and the comparative examples:

Poly(cyclohexylene-dimethylene)terephthalate (PCT): commercially available from Eastman Chemical Co., Kingsport, Tenn., USA. (product number: PCT 13319).

Ionomer: a copolymer comprising ethylene and 15 wt-% MAA (methacrylic acid), wherein 59 wt-% of the available carboxylic acid moieties are neutralized with sodium cations, supplied by E. I. du Pont de Nemours and Company, Wilmington, Del., USA under the trademark Surlyn®.

Ethylene epoxide copolymer: an ethylene butyl-acrylate glycidyl methacrylate copolymer (28 wt-% BA, 5.2 wt-% GMA) supplied by E. I. du Pont de Nemours and Company, Wilmington, Del., USA under the trademark Elvaloy®.

Ethylene alkyl acrylate copolymer: an ethylene methylacrylate copolymer (24 wt-% MA), supplied by Eastman Chemical Co., Kingsport, Tenn., USA.

Copolyester elastomer: a copolyetherester block copolymer consisted of hard blocks made of PBT and about 16% soft blocks made of poly(tetramethylene ether)glycol of molecular weight of 1000 g/mole and having a melt mass-flow rate of 12.5 g/10 min at 240° C. under 2.16 kg load, supplied by E. I. du Pont de Nemours and Company, Wilmington, Del., USA under the trademark Hytrel®.

Epon® 1009 is an epoxy resin supplied by Resolution Performance Products, Houston, Tex. 77210, USA.

Irganox® 1010 is a phenolic based antioxidant supplied by Ciba Specialty Chemicals, Tarrytown, N.Y., USA.

Ultranox® 626A is a diphosphite based antioxidant supplied by G.E. Specialty Chemicals, Parkersburg, W. Va., USA.

Vestowax® AO1535 is an oxidized polyethylene wax, lubricant supplied by Degussa GmbH, Düsseldorf, Germany.

Steamic OOS™ is a nucleant supplied by Talc de Luzenac, Toulouse, France.

TABLE 1

Polyester compositions

|  | C1 | C2 | C3 | E1 |
|---|---|---|---|---|
| PCT | 49.3 | 39.3 | 39.3 | 39.3 |
| copolyetherester copolymer | 30.0 | 30.0 | 30.0 | 30.0 |
| ethylene alkyl acrylate copolymer | 15.0 | 15.0 | 15.0 | 15.0 |
| ionomer | — | — | 10.0 | 5 |
| ethylene epoxide copolymer | — | 10.0 | — | 5 |
| Epon ® 1009 | 2.0 | 2.0 | 2.0 | 2.0 |
| Irganox ® 1010 | 1.5 | 1.5 | 1.5 | 1.5 |
| Ultranox ® 626 | 1.5 | 1.5 | 1.5 | 1.5 |
| Vestowax ® AO1535 | 0.2 | 0.2 | 0.2 | 0.2 |
| Steamic OOS F | 0.5 | 0.5 | 0.5 | 0.5 |

Ingredient quantities are given in wt-% on the basis of the total weight of the polyester composition.

The compositions of the Example (E1) and the Comparative Examples (C1-C3) were prepared by melt blending the ingredients shown in Table 1 in a 40 mm twin screw kneader operating at about 300° C. using a screw speed of about 350 rpm, a melt temperature displayed of about 300° C. and a melt temperature measured by hand of about 320° C. Upon exiting the extruder, the compositions were cooled and pelletized.

Mechanical Properties

Mechanical tensile properties, i.e. strain at break, were measured according to ISO 527. Measurements were done on injection molded ISO tensile bar R60 samples (melt temperature=280° C.; mold temperature=40° C. and a hold pressure of 80 MPa) with a thickness of the test specimen (tensile bar ISO 5A) of 2 mm and a width of 4 mm according to ISO 527. The test specimens were measured dried as moulded (DAM).

The test specimens were aged samples into air ovens to the heat aging procedure according to ISO 175 (air oven heat aging). At various heat aging times, the test specimens were removed from the oven and mechanical properties were measured according to ISO 527. The average values obtained from six specimens are given in Table 2.

Retention strain at break corresponds to the percentage of the strain at break after heat aging for 500 hours, 1000 hours and 1500 hours in comparison with the value of the specimens non-heat-aged (DAM) considered as being 100%. Strain at break retention results are given in Table 2.

TABLE 2

|  | C1 | C2 | C3 | E1 |
|---|---|---|---|---|
| Strain at Break at 23° C. [%] | | | | |
| Non-heat-aged (DAM) | 136 | 105 | 123 | 123 |
| Std. dev. [—] | 102 | 65 | 65 | 46 |
| heat aging at 160° C. for 500 h. | 12 | 38 | 29 | 38 |
| Std. dev. [—] | 7 | 14 | 16 | 17 |
| heat aging at 160° C. for 1000 h. | 10 | 26 | 23 | 42 |
| Std. dev. [—] | 3 | 3 | 14 | 10 |
| heat aging at 160° C. for 1500 h. | 8 | 22 | 29 | 38 |
| Std. dev. [—] | 2 | 8 | 16 | 6 |
| Retention of Strain at Break [%] | | | | |
| heat aging at 160° C. for 500 h. | 9% | 36% | 24% | 31% |
| heat aging at 160° C. for 1000 h. | 7% | 19% | 19% | 34% |
| heat aging at 160° C. for 1500 h. | 6% | 16% | 24% | 31% |

As shown in Table 2, the retention of strain at break upon 500 hours of heat aging at 160° C. was not significantly different between the polyester composition according to the present invention (E1) and the comparative examples. In contrast, the polyester composition according to the present invention (E1) exhibited a strongly improved retention of strain at break upon long-term heat-aging, i.e. after heat aging at 160° C. for 1000 hours and 160° C. for 1500 hours. Indeed, the polyester composition according to the present invention (E1) showed a retention value of 31% whereas comparative compositions (C1-C3) showed value between 6 and 24% after 1500 hours at 160° C.

The invention claimed is:

1. A polyester composition comprising:
   a) a poly(cyclohexylene-dimethylene)terephthalate polymer;
   b) at least one copolyester elastomer; and
   c) at least three ethylene copolymers comprising:
      c2) one or more ethylene acid copolymers and/or ionomers thereof; wherein the poly(cyclohexylene-dimethylene)terephthalate polymer is present in an amount of from about 30 to about 50 wt. % and wherein c2) the one or more ethylene acid copolymers and/or ionomers thereof are present in an amount of from about 1 to about 20 wt. % based on the total weight of the polyester composition; and wherein the at least three ethylene copolymers further comprise: c1) one or more ethylene alkyl-(meth)acrylate copolymers and c3) one or more ethylene epoxide copolymers.

2. The polyester composition according to claim 1 comprising from about 10 to about 50 wt. % of the at least one copolyester elastomer based on the total weight of the polyester composition.

3. The polyester composition according to claim 1 comprising from about 10 to about 50 wt. % of at the at least three ethylene copolymers based on the total weight of the polyester composition.

4. The polyester composition according to claim 1, wherein the at least one copolyester elastomer b) is a copolyetherester.

5. The polyester composition according to claim 1 further comprising one or more additional thermoplastic polyesters chosen among polyethylene terephthalate, polypropylene terephthalate, polybutylene terephthalate, polynaphthalene terephthalate, liquid crystalline polyesters and mixtures thereof.

6. The polyester composition according to claim 1 further comprising one or more oxidative stabilizers.

7. The polyester composition according to claim 6, wherein the one or more oxidative stabilizers are present in an amount from about 0.1 to about 5 wt. % based on the total weight of the polyester composition.

8. A method of manufacturing the polyester composition according to claim 1, comprising a step of mixing the poly(cyclohexylene-dimethylene)terephthalate polymer, the at least one copolyester elastomer; and the at least three ethylene copolymers comprising one or more ethylene acid copolymers and/or ionomers thereof; wherein the article demonstrates long-term heat aging resistance.

9. A shaped article made from the polyester composition according to claim 1.

10. The shaped article according to claim 9, which is an extruded article.

11. The shaped article according to claim 9, which is a hollow body, a laminate, a film or a filament.

12. The polyester composition of claim 1, wherein the polyester composition comprises from about 35 to about 50 wt. % of the poly(cyclohexylene-dimethylene)terephthalate polymer.

13. The polyester composition according to claim 1, wherein c1) the one or more ethylene alkyl-(meth)acrylate copolymers are present in an amount from about 5 to about 30 wt. % and wherein c3) the one or more ethylene epoxide copolymers are present in an amount from about 1 to about 20 wt. % based on the total weight of the polyester composition, provided that the sum of components c1), c2) and c3) is less than or equal to 50 wt. % based on the total weight of the polyester composition.

14. The polyester composition according to claim 1, wherein the composition exhibits a retention of strain at break of greater than 30% after heat-aging at 160° C. for 1000 hours.

15. The polyester composition according to claim 1, wherein the composition exhibits a retention of strain at break of greater than 30% after heat-aging at 160° C. for 1500 hours.

* * * * *